United States Patent
Song et al.

(10) Patent No.: US 6,477,912 B2
(45) Date of Patent: Nov. 12, 2002

(54) SIX-DEGREES-OF-FREEDOM PARALLEL MECHANISM FOR MICRO-POSITIONING WORK

(75) Inventors: Se-Kyong Song, Seoul (KR); Dong-Soo Kwon, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/726,305

(22) Filed: Dec. 1, 2000

(65) Prior Publication Data

US 2002/0007690 A1 Jan. 24, 2002

(30) Foreign Application Priority Data

Dec. 6, 1999 (KR) .............................. 99-55257

(51) Int. Cl.[7] .................................. B05J 9/14
(52) U.S. Cl. ................. 74/490.06; 74/479.01; 414/735; 901/29
(58) Field of Search ................. 74/471 XY, 479.01, 74/490.01, 490.03, 490.05, 490.06, 89.15; 414/735; 901/29, 15

(56) References Cited

U.S. PATENT DOCUMENTS

| | | | | |
|---|---|---|---|---|
| 4,666,362 A | * | 5/1987 | Landsberger et al. ........ | 414/735 |
| 4,739,241 A | * | 4/1988 | Vachtsevanos et al. ... | 901/29 X |
| 4,790,718 A | * | 12/1988 | Vickers ........................ | 414/735 |
| 4,819,496 A | * | 4/1989 | Shelef ...................... | 74/479.01 |
| 5,053,687 A | * | 10/1991 | Merlet ........................ | 901/29 X |
| 5,388,935 A | * | 2/1995 | Sheldon ...................... | 901/22 X |
| 5,538,373 A | * | 7/1996 | Kirkham .................... | 901/22 X |
| 5,771,747 A | * | 6/1998 | Sheldon .................... | 74/490.01 |
| 5,813,287 A | * | 9/1998 | McMurtry et al. ........ | 74/490.06 |
| 5,832,783 A | * | 11/1998 | Sheldon .................... | 74/490.03 |
| 5,941,128 A | * | 8/1999 | Toyama et al. ........... | 74/490.06 |
| 5,987,726 A | * | 11/1999 | Akeel .................. | 74/490.06 X |
| 6,059,703 A | * | 5/2000 | Heisel et al. .............. | 901/22 X |
| 6,196,081 B1 | * | 3/2001 | Yau .......................... | 74/479.01 |
| 6,285,098 B1 | * | 9/2001 | Nestler et al. ........ | 74/490.03 X |
| 6,329,812 B1 | * | 12/2001 | Sundin ................... | 74/471 XY |
| 6,330,837 B1 | * | 12/2001 | Charles et al. ........... | 74/490.06 |

FOREIGN PATENT DOCUMENTS

GB          2120202 A   *   11/1983

* cited by examiner

Primary Examiner—Thomas R. Hannon
Assistant Examiner—Colby Hansen
(74) Attorney, Agent, or Firm—Duane Morris LLP

(57) ABSTRACT

A six-degrees-of-freedom parallel mechanism for micro-positioning work is disclosed. This mechanism freely performs a desired motion of translation and rotation of a moving platform using internal and external links actuated by linear actuators capable of precisely controlling the link positions, thus being effectively used as a 6dof parallel mechanism required to carry out a variety of micro-positioning works within a limited workspace. In the mechanism of this invention, a moving platform 10 is placed at an upper position, with a multiaxial spherical joint 40 mounted to the central portion of the moving platform 10. A base platform 20 is placed at a lower position of the mechanism. Three external links 30 couple the moving platform 10 to the base platform 20, while three internal links 50 couple the multiaxial spherical joint 40 to the base platform 20. In this mechanism, the internal links 50 are commonly coupled to the multiaxial spherical joint 40 so as to form a tetrahedral structure. In addition, each of the internal and external links 50 and 30 is a linear actuator designed to be precisely controllable in its position.

8 Claims, 11 Drawing Sheets

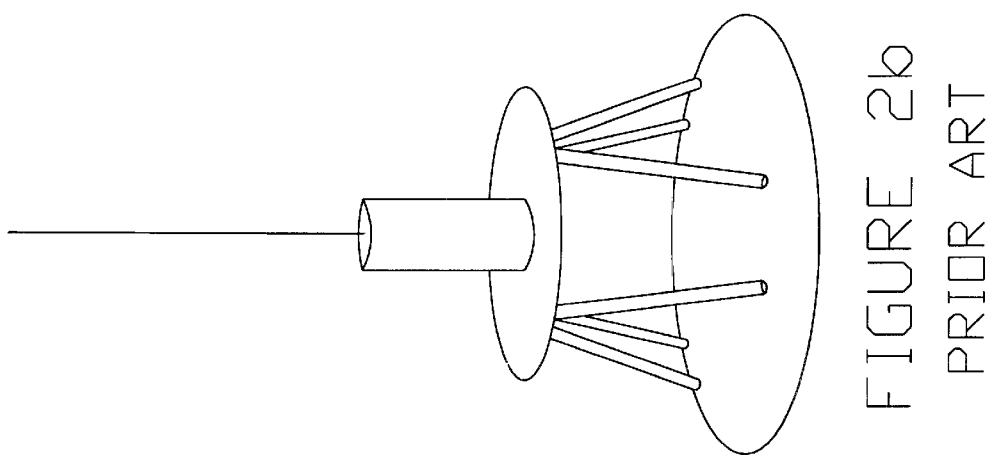

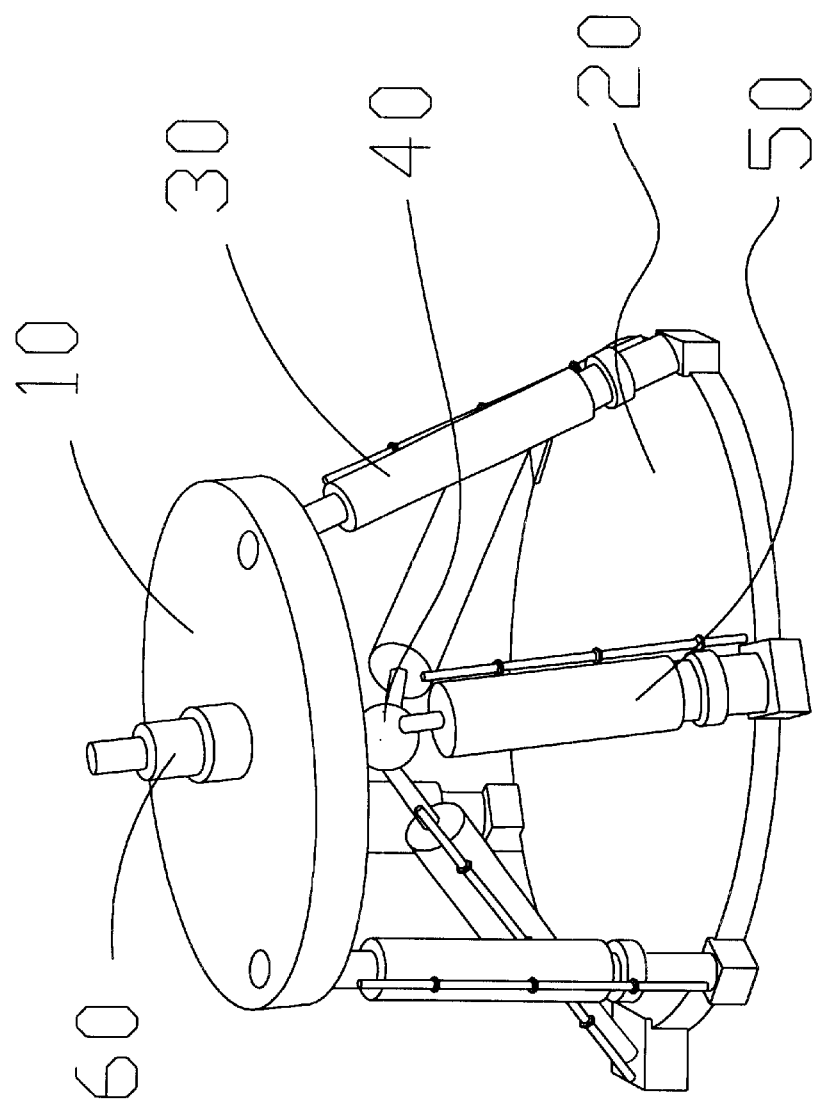

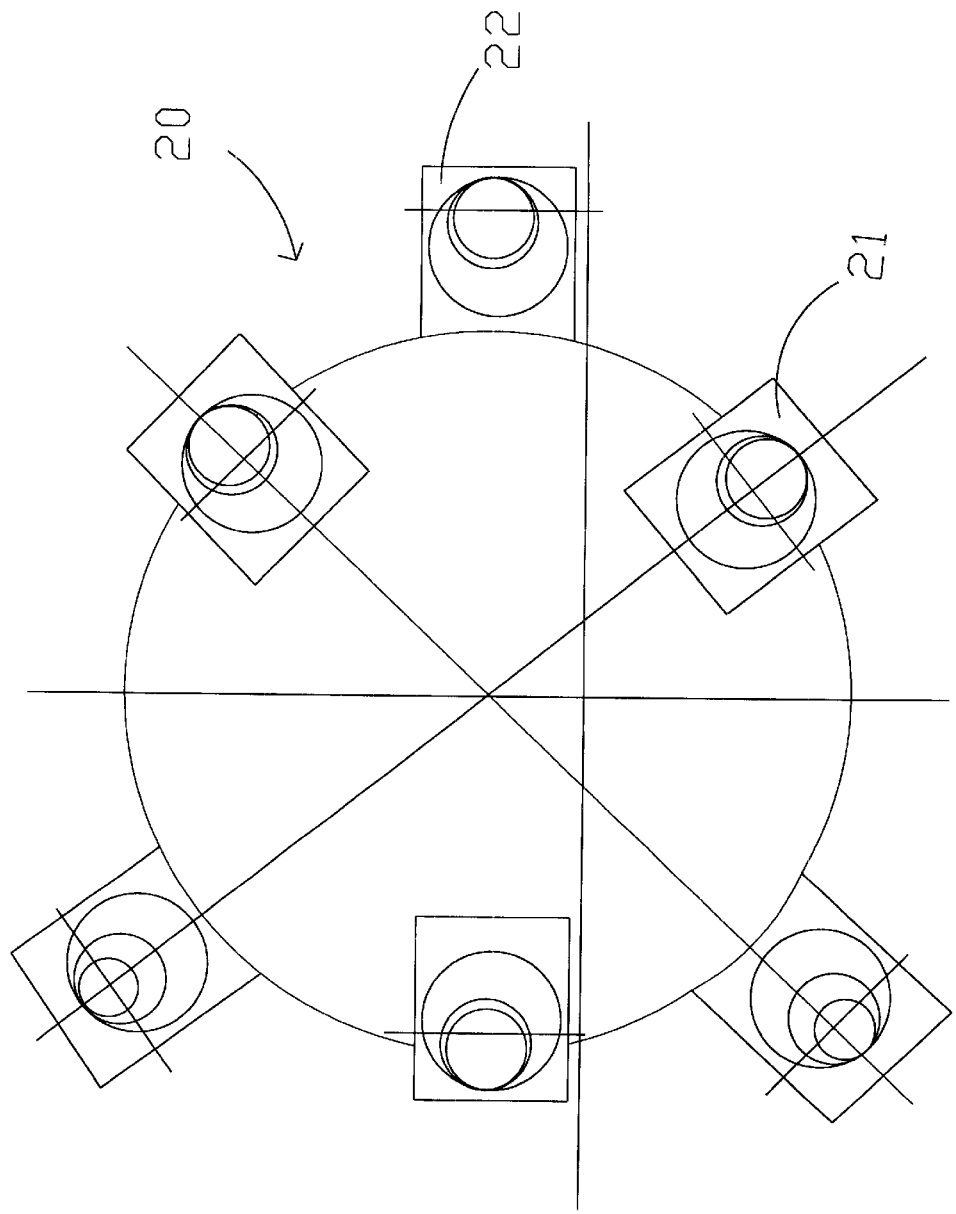

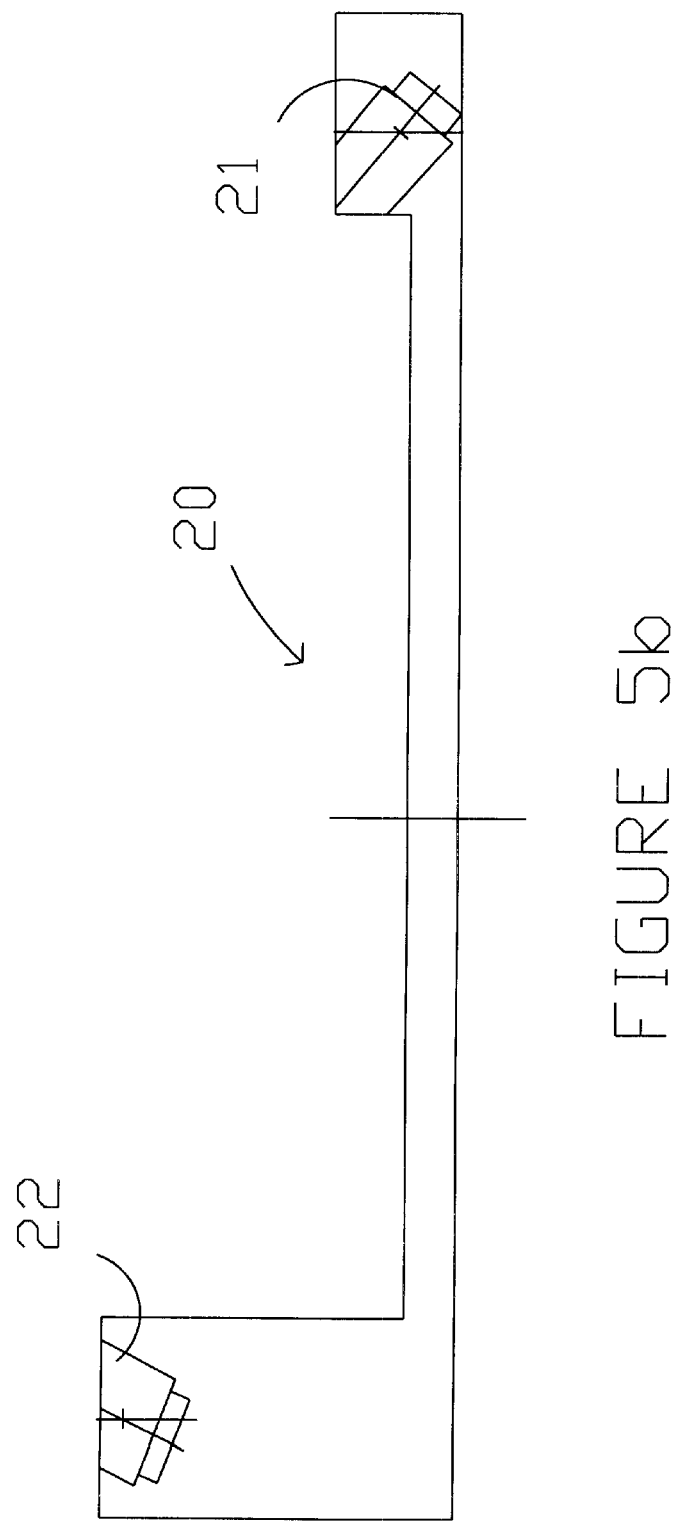

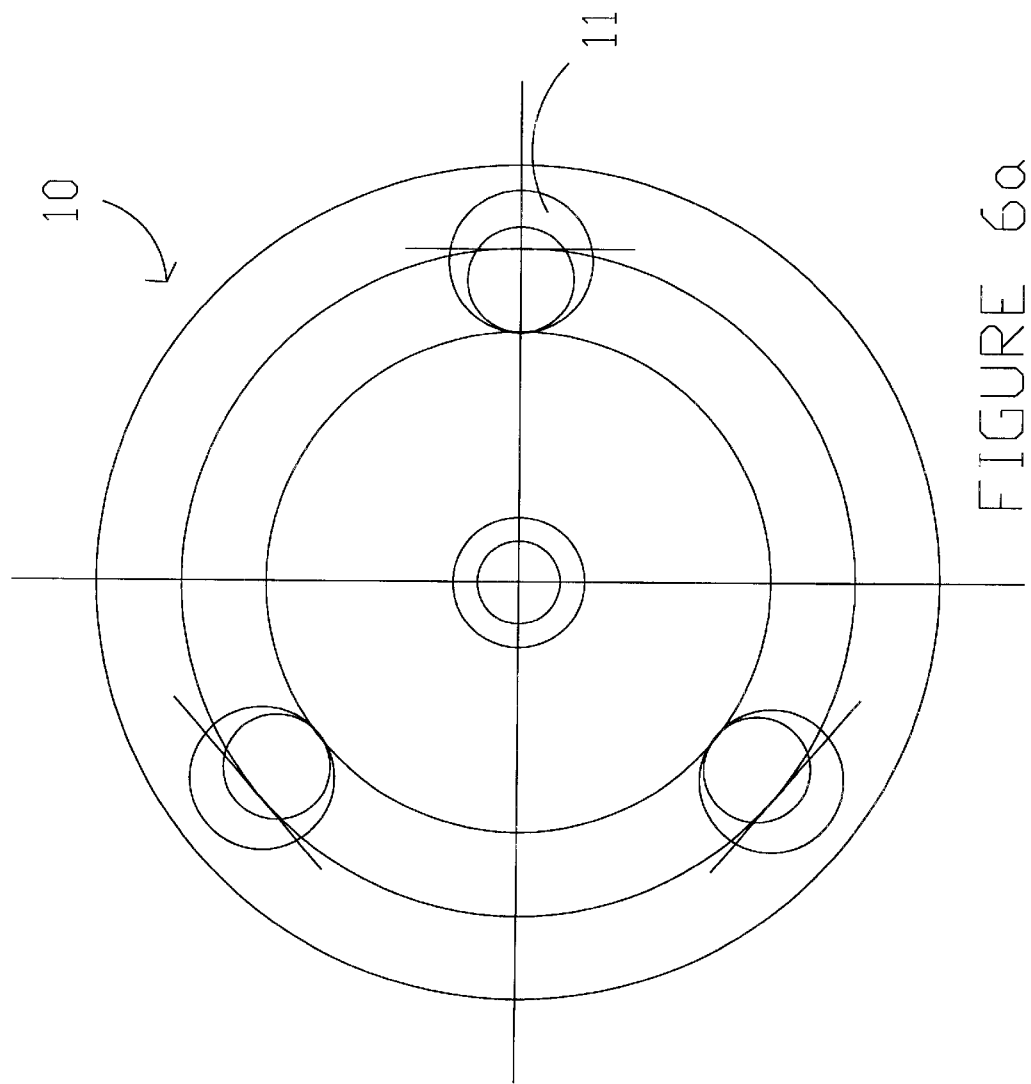

SIX-DEGREES-OF-FREEDOM PARALLEL MECHANISM FOR MICRO-POSITIONING WORK

BACKGROUND OF THE INVENTION

1. Field of the Invention

The present invention relates to six-degrees-of-freedom parallel mechanisms and, more particularly, to a six-degrees-of-freedom parallel mechanism for micro-positioning work, the mechanism consisting of three external links coupling a moving platform to a base platform and three internal links commonly coupled to one multiaxial spherical joint, with the external and internal links individually having a linear actuator structure capable of precisely controlling the position of the link.

2. Description of the Prior Art

In accordance with the recent trend of increased demand and increased importance of production and machining of high precision parts, production of semiconductors, microsurgery, gene manipulation and cell conformity in a variety of industrial fields, such as a high precision engineering field, a semiconductor manufacturing field, a medical field and a genetic engineering field, the study and development of robots or manipulators for micro-positioning work has been actively carried out.

In the prior art, a variety of serial robots with open links have been used as such manipulators for micro-positioning work in a variety of industrial fields. Due to their open links, such serial robots are somewhat advantageous in that they preferably provide a large workspace, and preferably accomplish improved manipulability. However, these serial robots are problematic in that they inevitably create accumulated errors at their end effectors since they have serial actuators. The serial robots are thus undesirably deteriorated in their operational accuracies. Another problem experienced in the conventional serial robots resides in that their operational performance is undesirably reduced, particularly when they are used in high-speed work or other work with excessively variable weight of dynamic load.

In an effort to overcome such problems experienced in the conventional serial robots, a variety of parallel mechanisms have been actively studied since the 1980s. Such parallel mechanisms have a closed chain structure, and so they are free from actuator-caused errors accumulated at their end effectors in addition to preferably having a high structural strength different from the conventional serial robots, even though the workspace provided by the parallel mechanisms is regrettably smaller than that of the serial robots. The parallel mechanisms thus accomplish a desirably high operational performance when they are used in high-speed work or other work with excessively variable weight of dynamic load. Therefore, it is more preferable to use such parallel mechanisms in place of the conventional serial mechanisms for micro-positioning work.

Such parallel mechanisms are structurally advantageous in a variety of items as described above, and so they can be preferably used in micro-positioning work. However, in order to allow such parallel mechanisms to effectively carry out a variety of desired works within a limited workspace, it is necessary that such a parallel mechanism have six degrees of freedom. That is, in a parallel mechanism for micro-positioning work, it is necessary to set the degree of positional precision of actuators to 20 $\mu$m or less, and the resolution of position sensors to 5 $\mu$m or less in addition to providing effective workspace of at least 20 mm.

FIG. 1 is a perspective view of a conventional three-degrees-of-freedom micromotion in-parallel actuated mechanism. FIGS. 2a and 2b are perspective views of conventional micro hand modules using six-degrees-of-freedom parallel link mechanisms. For ease of description, the two terms "three-degrees-of-freedom" and "six-degrees-of-freedom" will be referred to simply as "3dof" and "6dof" herein below.

As shown in FIG. 1, Lee analyzed and experimentally established the kinematics and dynamics of a 3dof micromotion in-parallel actuated manipulator using a piezo-actuator (Lee, K. M., 1991, "A 3dof Micromotion In-Parallel Actuated Manipulator", IEEE Transactions on Robotics and Automation, Vol. 7, No. 3, pp. 634~641).

As shown in FIGS. 2a and 2b, Arai and Stoughton fabricated and analyzed super-precise 6dof parallel micro hand modules using a piezo-actuator (Arai, T. and Stoughton R., 1992, "Micro Hand Module using Parallel Link mechanism", ASME, Proceedings of the Japan U.S.A, Book No. 10338A, pp. 163~169).

On the other hand, in an effort to point out and solve the problems and limitations of conventional serial robots, Hollis proposed a 6dof micromotion parallel mechanism using a magnetically levitated actuator (Hollis, R. L., 1991, "A 6dof Magnetically Levitated Variable Compliance Fine-Motion Wrist: Design, Modeling, and Control", IEEE Transactions on Robotics and Automation, Vol. 7, No. 3, pp. 320~332).

The object of the mechanisms proposed in the above-mentioned three cited references is to perform micro-positioning work with a high resolution using a piezo-actuator or a magnetically levitated actuator having a high degree of positional precision, on a level of micrometers. However, in said mechanisms, the linear displacement of the piezo-actuators is limited to 10 $\mu$m or less, the linear displacement of the magnetically levitated actuator is limited to about 5 $\mu$m, and the workspace is limited to about 4 $\mu$m. Therefore, the above mechanisms cannot be effectively or properly used as general 6dof mechanisms for micro-positioning work since such general 6dof mechanisms require a degree of positional precision of actuators set to 20 $\mu$m or less, a resolution of position sensors set to 5 $\mu$m or less in addition to an effective workspace of at least 20 mm as described above.

SUMMARY OF THE INVENTION

Accordingly, the present invention has been made keeping in mind the above problems occurring in the prior art, and an object of the present invention is to provide a 6dof parallel mechanism for micro-positioning work, which freely performs a desired motion of translation and rotation of a moving platform using internal and external links actuated by linear actuators capable of precisely controlling the link positions, thus being effectively used as a 6dof parallel mechanism required to carry out a variety of micro-positioning works within a limited workspace.

In order to accomplish the above object, the present invention provides a 6dof parallel mechanism for micro-positioning work, comprising: a moving platform placed at an upper position, with a multiaxial spherical joint mounted to the central portion of the moving platform; a base platform placed at a lower position; a plurality of external links coupling the moving platform to the base platform; and a plurality of internal links coupling the multiaxial spherical joint of the moving platform to the base platform.

In the 6dof parallel mechanism of this invention, the internal links are commonly coupled to the multiaxial spherical joint so as to form a tetrahedral structure.

In addition, each of the internal and external links is a linear actuator designed to be precisely controllable in its position.

The 6dof parallel mechanism of this invention also preferably enlarges the workspace to at least 20 mm, and preferably reduces the number of ball and socket joints of the moving platform from six to three, thus enlarging the area of rotation of the moving platform. In addition, the desired motion of rotation of the moving platform of this mechanism is performed by use of three linearly actuated external links.

BRIEF DESCRIPTION OF THE DRAWINGS

The above and other objects, features and other advantages of the present invention will be more clearly understood from the following detailed description taken in conjunction with the accompanying drawings, in which:

FIGS. 2a and 2b are perspective views of micro hand modules using conventional 6dof parallel link mechanisms with piezo-actuators;

FIG. 3 is a perspective view of a 6dof parallel mechanism for micro-positioning work in accordance with the preferred embodiment of the present invention;

FIGS. 5a and 5b are a plan view and a sectional view of a base platform of the 6dof parallel mechanism of FIG. 3;

DETAILED DESCRIPTION OF THE INVENTION

Figure 1:
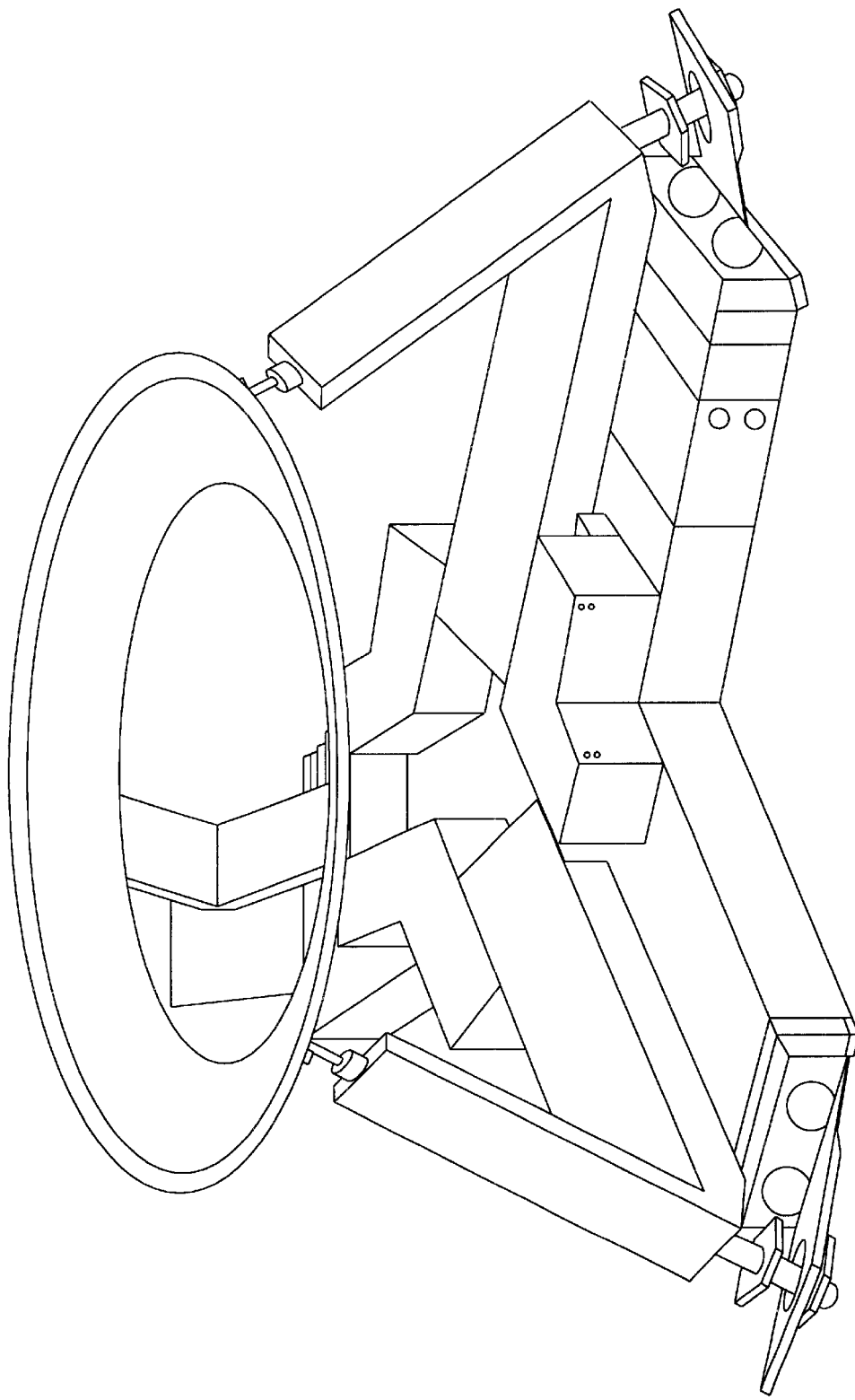
FIG. 1 is a perspective view of a conventional 3dof micromotion in-parallel actuated mechanism with piezo-actuators; actuators.
Figure 2A:
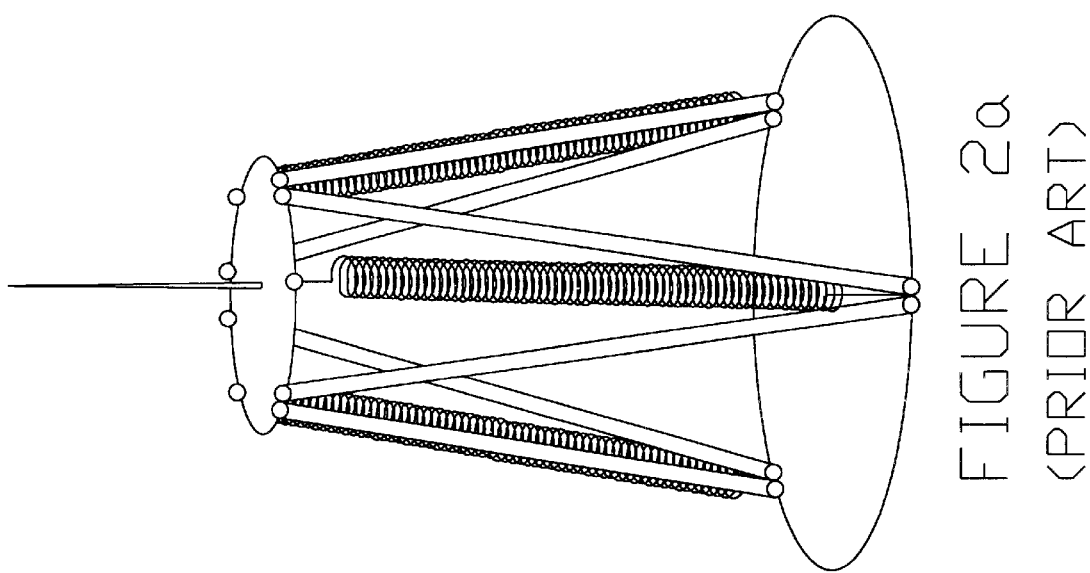

Reference now should be made to the drawings, in which the same reference numerals are used throughout the different drawings to designate the same or similar components.

Figure 4:
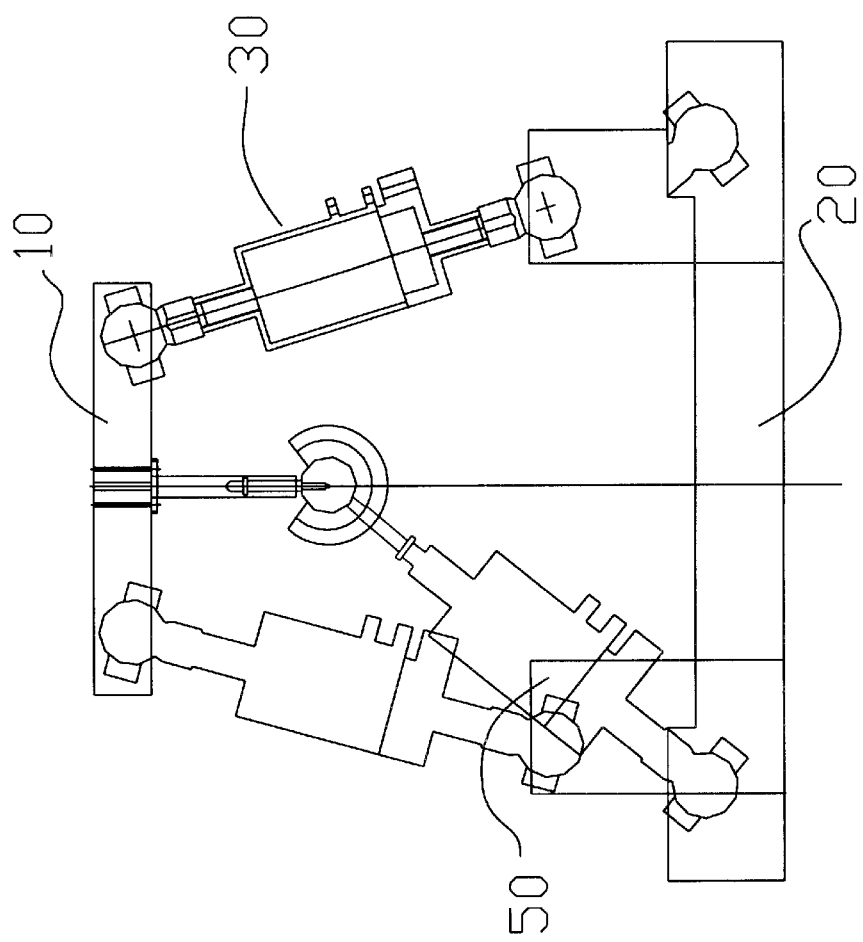
FIG. 4 is a view, showing a jointed structure of a plurality of linearly actuated internal and external links of the 6dof parallel mechanism of FIG. 3.
Figure 6K:
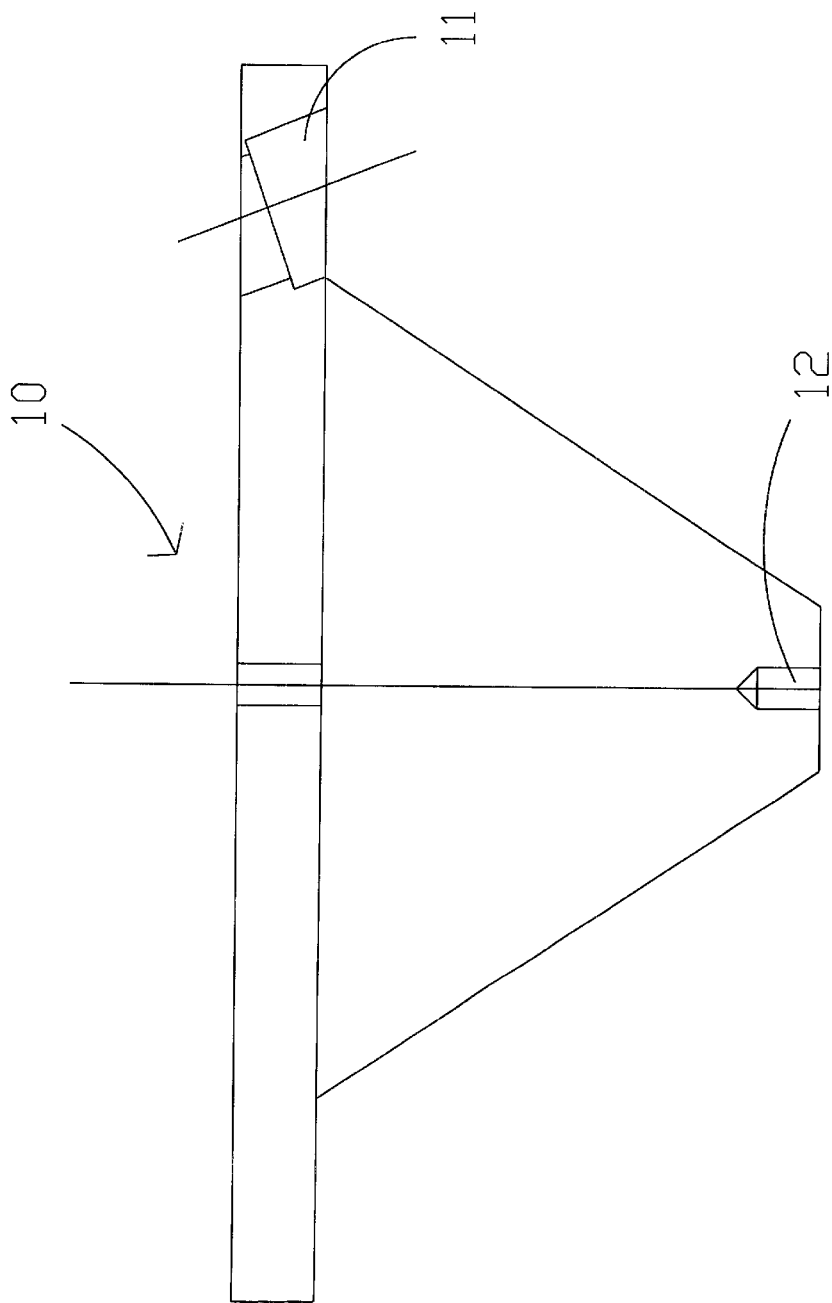
FIGS. 6a and 6b are a plan view and a sectional view of a moving platform of the 6dof parallel mechanism of FIG. 3.
Figure 7:
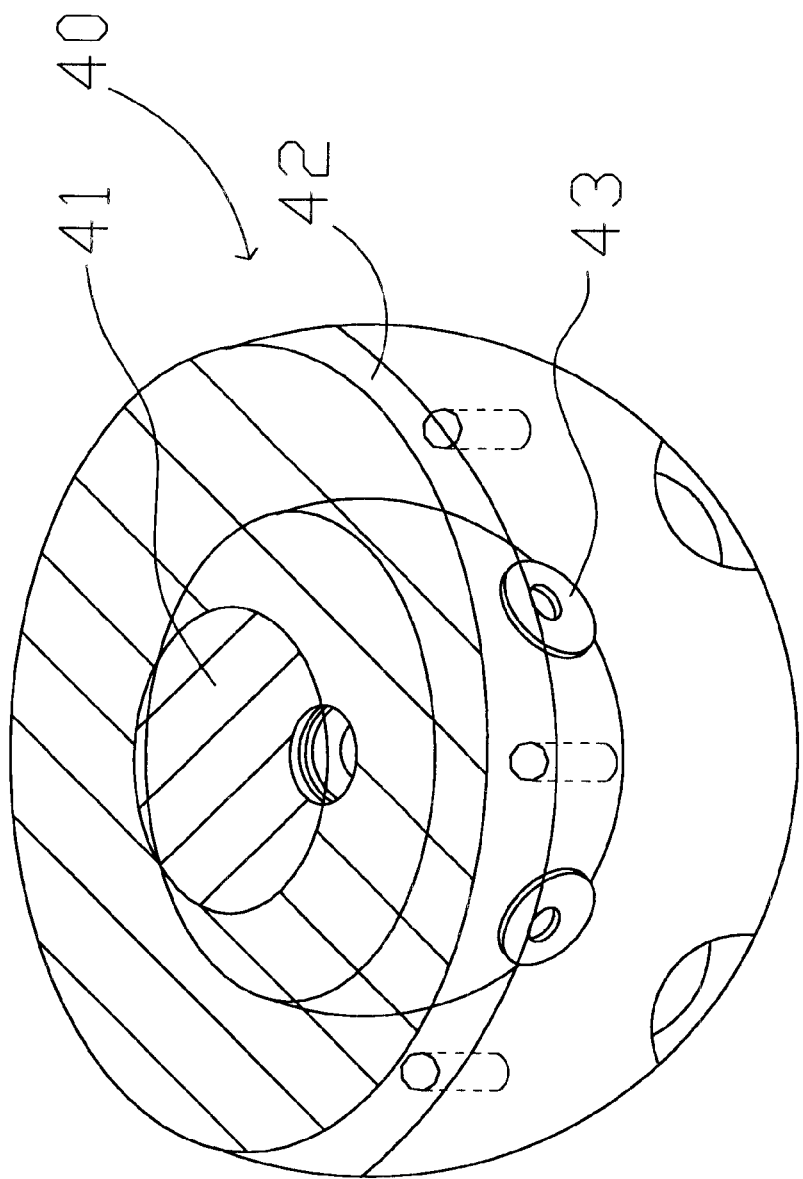
FIG. 7 is a perspective view of a multiaxial spherical joint included in the 6dof parallel mechanism of FIG. 3.
Figure 8:
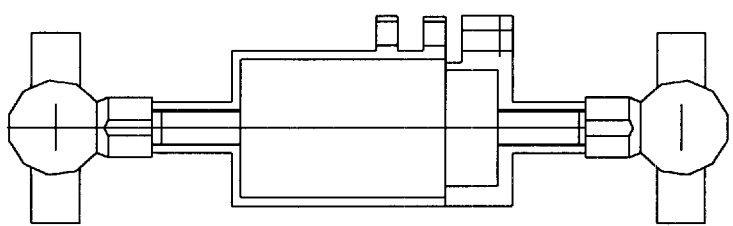
FIG. 8 is a view, showing the construction of a linear actuator for the internal and external links included in the 6dof parallel mechanism of FIG. 3.

FIG. 3 is a perspective view of a 6dof parallel mechanism for micro-positioning work in accordance with the preferred embodiment of this invention. FIG. 4 is a view, showing a jointed structure of a plurality of linearly actuated internal and external links of this 6dof parallel mechanism. FIGS. 5a and 5b are a plan view and a sectional view of a base platform of this 6dof parallel mechanism. FIGS. 6a and 6b are a plan view and a sectional view of a moving platform of the 6dof parallel mechanism. FIG. 7 is a perspective view of a multiaxial spherical joint included in the 6dof parallel mechanism. FIG. 8 is a view, showing the construction of a linear actuator for the internal and external links included in the 6dof parallel mechanism.

Referring first to FIGS. 3 and 4, the 6dof parallel mechanism according to the preferred embodiment of this invention comprises a moving platform 10 positioned at an upper portion of the mechanism, a base platform 20 positioned at the lower portion of the mechanism, three external links 30 coupling the moving platform 10 to the base platform 20, and three internal links 50 commonly coupled to one multiaxial spherical joint 40 so as to couple the two platforms 10 and 20 to each other, while forming a tetrahedral structure.

As shown in FIGS. 5a and 5b, three first external link connectors 21 are upwardly positioned along the edge of the base platform 20 at three positions regularly spaced at angular intervals of 120°. In addition, three internal link connectors 22 are also upwardly positioned along the edge of the base platform 20 at three positions between the three first external link connectors 21. In such a case, the height of the internal link connectors 22 is slightly lower than that of the first external link connectors 21.

As shown in FIGS. 6a and 6b, three second external link connectors 11 are provided on the moving platform 10 at three positions regularly spaced at angular intervals of 120°. The center of the moving platform 10 is provided with an internally-threaded opening, thus engaging with an externally-threaded connection rod 60 at said internally-threaded opening. A spherical joint connection part 12, having a frustum shape, is provided on the lower surface of the moving platform 10 at the central portion, and holds the multiaxial spherical joint 40 at its lower end.

As shown in FIG. 7, the multiaxial spherical joint 40 comprises a central ball 41, which is movably covered with a hollow spherical body 42 such that the ball 41 is not unexpectedly removed from the body 42. The spherical body 42 has a plurality of link insert openings, with a plurality of link support discs 43 being set within the joint 40 and used for coupling the internal links 50 to the joint 40 while preventing the links 50 from being undesirably removed from the joint 40.

The two platforms 10 and 20 are assembled with each other into a desired 6dof parallel mechanism using the multiaxial spherical joint 40 and the two types of links 30 and 50 as follows:

As shown in FIGS. 3 to 8, the central ball 41 of the spherical joint 40 is primarily connected to the spherical joint connection part 12 of the moving platform 10. Thereafter, the three internal links 50 are connected to the support discs 43 of the joint 40 at ends thereof, thus forming a tetrahedral structure. The other ends of the three internal links 50 are coupled to the three internal link connectors 22 of the base platform 20 using three ball and socket joints.

In addition, the three external links 30 are coupled to the three first external link connectors 21 of the base platform 20 and the three second external link connectors 11 of the moving platform 10 at their opposite ends using a plurality of ball and socket joints in the same manner as that described above.

Each of the external and internal links 30 and 50, used for coupling the two platforms 10 and 20 into a desired mechanism, is a linear actuator as shown in FIG. 8. In the present invention, the linear actuators used as the external and internal links 30 and 50 are selected from linear actuators having a degree of positional precision of 3 μm or less and an effective workspace of at least 20 mm and being capable of performing micro-positioning work of several micrometers, for example, the linear actuators proposed in Korean Patent Application No. 99-15368. Such linear actuators freely perform a motion of 3dof translation and a motion of 3dof rotation of the moving platform 10.

In an operation of the 6dof parallel mechanism of this invention, the mechanism primarily accomplishes a motion of translation of the moving platform 10 to allow the platform 10 to reach a desired workspace. When the mechanism accomplishes the desired motion of translation of the moving platform 10, the three internal links 50 are fixed. In such a case, a desired motion of 3dof rotation of the moving platform 10 is performed only by the three external links 30. It is thus possible to improve the linearity of the 6dof parallel mechanism of this invention and to easily control the operation of the mechanism.

In a brief description, the 6dof parallel mechanism for micro-positioning work of this invention results from a change of the structure of conventional 6dof parallel mechanisms such that the number of ball and socket joints of the moving platform 10 is preferably reduced from six to three in addition to accomplishing a desired high structural stability of the mechanism by use of one multiaxial spherical joint 40 for the three internal links 50.

In addition, the 6dof parallel mechanism of this invention is simple in its kinematic analysis in comparison with the other types of parallel mechanisms, and so it is possible to accomplish the rear time control for the mechanism of this invention.

As described above, the present invention provides a 6dof parallel mechanism for micro-positioning work. The 6dof parallel mechanism of this invention freely performs a desired motion of translation and rotation of a moving platform using linearly actuated internal and external links, thus being effectively used as a 6dof parallel mechanism required to carry out a variety of micro-positioning works within a limited workspace.

The 6dof parallel mechanism of this invention uses micro-positioning linear actuators as the links, thus smoothly performing micro-positioning work requiring a level of precision of several micrometers.

The 6dof parallel mechanism of this invention freely performs a desired motion of translation and rotation of a moving platform within a limited workspace, and precisely controls the movement of the moving platform by use of the linearly actuated links having a high degree of positional precision. Therefore, the mechanism of this invention can be preferably used in production and machining of high precision parts, production of semiconductors, microsurgery, gene manipulation and cell conformity in a variety of industrial fields, such as a high precision engineering field, a semiconductor manufacturing field, a medical field and a genetic engineering field.

In an operation of the 6dof parallel mechanism of this invention, it is possible to accomplish a desired motion of 3dof rotation of the moving platform only by use of the three external links, with the three internal links being fixed. It is thus possible for the mechanism of this invention to separately perform the motion of 3dof translation and the motion of 3dof rotation of the moving platform.

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, the 6dof parallel mechanism of this invention may be preferably used as a wrist mechanism of robots, and a hexa-axial force/torque sensor in addition to the mechanism for micro-positioning work.

What is claimed:

1. A six-degrees-of-freedom parallel mechanism for micro-positioning work, comprising:

a moving platform;

a base platform;

a multiaxial spherical joint moveably positioned with respect to said moving platform and said base platform;

a connection rod connecting said moving platform center to a center of said multiaxial spherical joint;

a plurality of external links coupling said moving platform to said base platform; and a plurality of internal links coupling said multiaxial spherical joint to said base platform.

2. The six-degrees-of-freedom parallel mechanism according to claim 1, wherein said internal links are commonly coupled to said multiaxial spherical joint and to said base platform as so to form a tetrahedral structure.

3. The six-degrees-of-freedom parallel mechanism according to claim 2, wherein each of said internal and external links is a linear actuator precisely controllable in its position.

4. The six-degrees-of-freedom parallel mechanism according to claim 1, wherein each of said internal and external links is a linear actuator precisely controllable in its position.

5. The six-degrees-of-freedom parallel mechanism according to claim 1, wherein said base platform further comprises:

a plurality of internal link connectors for connecting said internal links to said base platform at an equivalent angular interval; and a plurality of external link connectors for connecting said external links to said base platform at an equivalent angular interval.

6. The six-degrees-of-freedom parallel mechanism according to claim 5, wherein said internal link connectors and said external link connectors are alternatively located around said base platform.

7. The six-degrees-of freedom parallel mechanism according to claim 5, wherein said external links connect to said moving platform and said base platform via ball and socket joints.

8. The six-degrees-of-freedom parallel mechanism according to claim 5, wherein said internal links connect to said base platform via ball and socket joints.

* * * * *